(12) United States Patent
Miyoshi

(10) Patent No.: US 11,722,651 B2
(45) Date of Patent: Aug. 8, 2023

(54) AUGMENTED REALITY GLASSES DEVICE AND DISPLAY PROGRAM

(71) Applicant: FANUC CORPORATION, Yamanashi (JP)

(72) Inventor: Takashi Miyoshi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 169 days.

(21) Appl. No.: 16/919,591

(22) Filed: Jul. 2, 2020

(65) Prior Publication Data

US 2021/0021797 A1 Jan. 21, 2021

(30) Foreign Application Priority Data

Jul. 18, 2019 (JP) ................. 2019-133094

(51) Int. Cl.
*H04N 13/111* (2018.01)
*G06T 7/285* (2017.01)
*H04N 13/00* (2018.01)

(52) U.S. Cl.
CPC ............ *H04N 13/111* (2018.05); *G06T 7/285* (2017.01); *G06T 2207/30164* (2013.01); *H04N 2013/0085* (2013.01); *H04N 2213/008* (2013.01)

(58) Field of Classification Search
CPC ......... H04N 13/111; H04N 2013/0085; H04N 2213/008; G06T 7/285; G06T 2207/30164
USPC ......................................................... 345/419
See application file for complete search history.

(56) References Cited

U.S. PATENT DOCUMENTS

| | | | | |
|---|---|---|---|---|
| 7,733,339 | B2* | 6/2010 | Laning | G06F 30/00 700/98 |
| 2005/0194535 | A1* | 9/2005 | Noji | G06T 7/001 250/311 |
| 2012/0257276 | A1* | 10/2012 | Tezuka | G05B 19/4068 359/464 |
| 2014/0180467 | A1* | 6/2014 | Sato | G05B 19/4062 700/184 |
| 2017/0314910 | A1* | 11/2017 | Ikebuchi | G06T 7/73 |
| 2018/0130376 | A1* | 5/2018 | Meess | B23K 9/0953 |
| 2019/0332086 | A1* | 10/2019 | Aizawa | G05B 19/182 |
| 2020/0068184 | A1* | 2/2020 | Shadik | H04N 13/128 |
| 2020/0372632 | A1* | 11/2020 | Chauhan | G06T 7/0012 |

FOREIGN PATENT DOCUMENTS

| | | |
|---|---|---|
| JP | 2010-061661 A | 3/2010 |
| JP | 2012-221309 A | 11/2012 |
| JP | 2014-180707 A | 9/2014 |

(Continued)

*Primary Examiner* — Joseph G Ustaris
*Assistant Examiner* — Jimmy S Lee
(74) *Attorney, Agent, or Firm* — Studebaker & Brackett PC

(57) ABSTRACT

An augmented reality glasses device including a pair of transmissive display sections and capable of displaying a path of a tool in a machine tool on the display sections includes a block acquisition section that acquires a program block causing the tool to move and operate, a path determination section that determines a path and a movement direction of the tool in a workpiece coordinate system in accordance with a plurality of the acquired successive time-series program blocks, and a display control section that causes the display sections to stereographically display the determined path and movement direction of the tool.

6 Claims, 11 Drawing Sheets

(56) References Cited

FOREIGN PATENT DOCUMENTS

| | | |
|---|---|---|
| JP | 2015-079491 A | 4/2015 |
| JP | 2018-092476 A | 6/2018 |
| WO | 2016/009970 A1 | 1/2016 |
| WO | 2019/092792 A1 | 5/2019 |

* cited by examiner

AUGMENTED REALITY GLASSES DEVICE AND DISPLAY PROGRAM

This application is based on and claims the benefit of priority from Japanese Patent Application No. 2019-133094, filed on 18 Jul. 2019, the content of which is incorporated herein by reference.

BACKGROUND OF THE INVENTION

Field of the Invention

The present invention relates to an augmented reality glasses device and a display program.

Related Art

A numerical control apparatus that controls a machine tool and that displays a movement path of a tool on a screen of the apparatus is known. With the apparatus, it is possible to check the machining status of a workpiece by using the movement path of the tool. An apparatus that, at the time of debugging machining programs, is able to repeat running and stopping of each individual machining program is also known.

With such an apparatus, by displaying the movement path of a tool in an individual machining program, it is possible to run an individual machining program while checking the operation of the machining program. In contrast, it is more preferable that not only the movement path of a subject of operation but also the movement direction of the subject of operation be shown. An apparatus that is able to also show the movement direction of a robot that is a subject of operation has been proposed (see, for example, Patent Document 1).

Patent Document 1: Japanese Unexamined Patent Application, Publication No. 2014-180707

SUMMARY OF THE INVENTION

Incidentally, in some machine tools, a machining position is moved as a result of movement of not only the tip of a tool but also movement of a table on which a workpiece is mounted. For example, in an orthogonal coordinate system represented by an X-axis, a Y-axis, and a Z-axis, the tip of the tool can move only in the Z-axis direction. At this time, the table can move in the X-axis direction and in the Y-axis direction. Even in the case where a plurality of subjects of operation relatively moves in this way, it is preferable that the relative position of the tip of the tool in the workpiece coordinate system be intuitively displayed.

(1) An aspect of the disclosure relates to an augmented reality glasses device. The augmented reality glasses device including a pair of transmissive display sections and capable of displaying a path of a tool in a machine tool on the display sections includes a block acquisition section that acquires a program block causing the tool to move and operate, a path determination section that determines a path and a movement direction of the tool in a workpiece coordinate system in accordance with a plurality of the acquired successive time-series program blocks, and a display control section that causes the display sections to stereographically display the determined path and the movement direction of the tool.

(2) An aspect of the disclosure relates to a display program. The display program that causes a computer to function as an augmented reality glasses device. The augmented reality glasses device includes a pair of transmissive display sections and is capable of displaying a path of a tool in a machine tool on the display sections. The display program causes the computer to function as a block acquisition section that acquires a program block causing the tool to move and operate, a path determination section that determines a path and a movement direction of the tool in a workpiece coordinate system in accordance with a plurality of the acquired successive time-series program blocks, and a display control section that causes the display sections to stereographically display the determined path and the movement direction of the tool.

According to the disclosure, an augmented reality glasses device and a display program that are capable of intuitively displaying a position of a tip of a tool in a workpiece coordinate system are provided.

DETAILED DESCRIPTION OF THE INVENTION

Hereinafter, an augmented reality glasses device 1 and a display program according to each embodiment of the disclosure will be described with reference to FIG. 1 to FIG. 12. Before the augmented reality glasses device 1 and the display program according to each of the embodiments are described, a machine tool 100 and a numerical control apparatus 200 that are associated with the augmented reality glasses device 1 will be described. In the following description, a "workpiece coordinate system" denotes a coordinate system that is determined by, for example, manual control over a machine tool and denotes a coordinate system with reference to a workpiece that is an object of machining.

Figure 1:
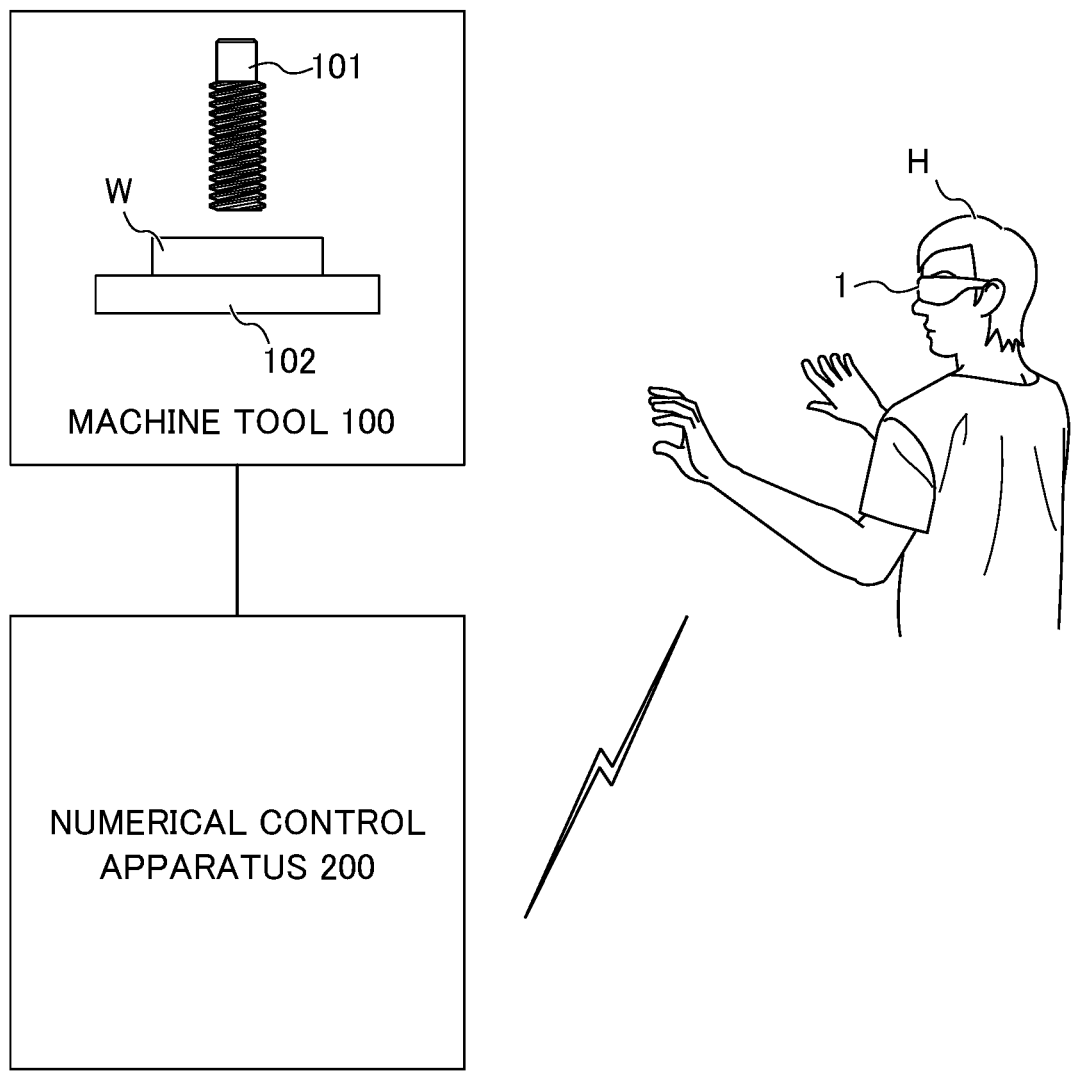
FIG. 1 is a schematic configuration diagram showing the overall configuration of an augmented reality glasses device and a display program according to a first embodiment.

As shown in FIG. 1, the machine tool 100 is, for example, a machining apparatus that is connected to the numerical control apparatus 200, as shown in FIG. 1. The machine tool 100 operates in accordance with an operation signal that is output from the numerical control apparatus 200. The machine tool 100 includes a table 102 for mounting a workpiece W and a tool 101 disposed above the table 102. The machine tool 100, for example, machines the workpiece W by operating both the table 102 and the tool 101 in accordance with the operation signal. The machine tool 100 operates in accordance with any one of automatic control in accordance with a command from the numerical control apparatus 200 and manual control using a manual pulse generator (not shown). Automatic control is used when, for example, the workpiece W is actually cut with the tool 101. Manual control is used when, for example, debugging, detection of the workpiece W, or the like is performed.

The numerical control apparatus 200 is an apparatus capable of outputting an operation signal to the machine tool 100 in accordance with program blocks of a machining program set in advance. In the present embodiment, the numerical control apparatus 200 is installed as a set with the single machine tool 100. The numerical control apparatus 200 controls the operation of the machine tool 100 in accordance with a series of operation signals by sequentially running a series of program blocks included in the machining program.

With the above-described machine tool 100 and numerical control apparatus 200, the machine tool 100 is manually controlled and then automatically controlled. First, the machine tool 100 is, for example, manually controlled by using the pulse generator to move the tip of the tool 101 or the table 102 in each designated axis direction of the X-, Y-, and Z-axes. With the tip of a measurement probe (not shown) attached instead of the tool 101, the location, size, and the like, of the workpiece W are obtained.

Subsequently, the machine tool 100 is automatically controlled by the program blocks running in the numerical control apparatus 200. The machine tool 100, for example, actually cuts the workpiece W with the tool 101 by using cutting fluid (not shown).

First Embodiment

Figure 2:
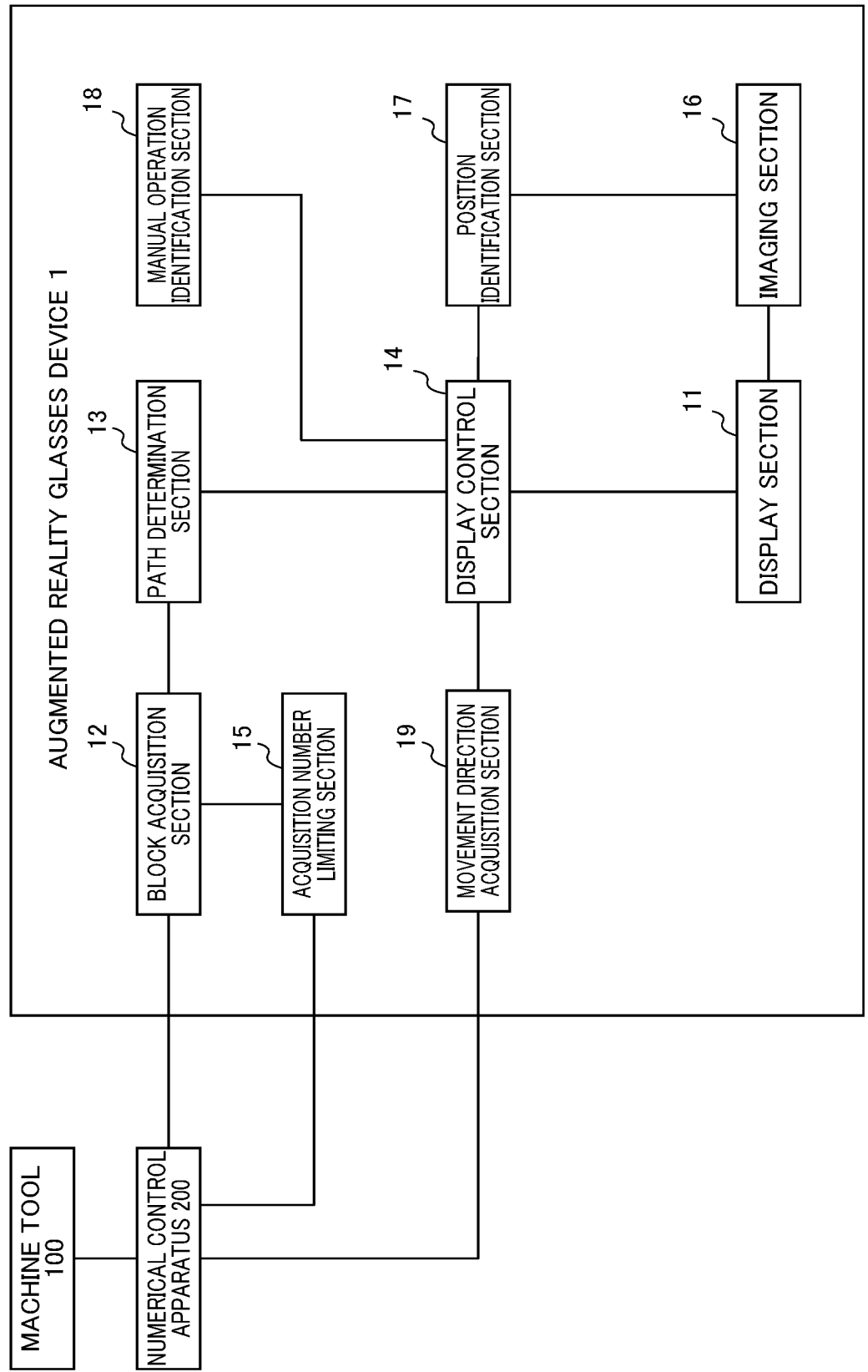
FIG. 2 is a block diagram showing the configuration of the augmented reality glasses device according to the first embodiment.

Next, the augmented reality glasses device 1 and the display program according to the first embodiment will be described with reference to FIG. 1 to FIG. 7. The augmented reality glasses device 1 according to the present embodiment is, for example, a device that displays paths and movement directions of the tip of the tool 101 in the workpiece coordinate system. Specifically, the augmented reality glasses device 1 is a glasses-type display device capable of checking the status of machining in the machine tool 100. The augmented reality glasses device 1 is worn by a worker H that manages the numerical control apparatus 200 and the machine tool 100. The augmented reality glasses device 1 is, for example, associated with a set of the numerical control apparatus 200 and the machine tool 100. The augmented reality glasses device 1 is connected to the numerical control apparatus 200 so as to communicate wirelessly. As shown in FIG. 2, the augmented reality glasses device 1 includes a pair of display sections 11, a block acquisition section 12, a path determination section 13, a display control section 14, an acquisition number limiting section 15, an imaging section 16, a position identification section 17, a manual operation identification section 18, and a movement direction acquisition section 19.

The display sections 11 are each, for example, a transmissive display. The display sections 11 are disposed in pairs in front of the eyes of the worker H. The display sections 11 are each configured to be capable of displaying various pieces of information for an image to pass therethrough. The display sections 11 each, for example, transmit the images of the tool 101 and table 102 of the machine tool 100 and display various pieces of information in a superimposed manner on the images of the tool 101 and table 102.

The block acquisition section 12 is, for example, implemented by operation of a CPU. The block acquisition section 12 acquires program blocks that cause the tool 101 to move and operate. The block acquisition section 12 acquires, for example, program blocks that are loaded during or just before running for a machining program set in advance in the numerical control apparatus 200. Specifically, the block acquisition section 12 acquires a predetermined number of a series of program blocks in the middle of or just before being used in the operation of the tool 101 for the machining program. In the present embodiment, the block acquisition section 12 acquires a predetermined number of program blocks including an active program block or a program block to run next and one or more program blocks to be executed subsequently thereafter from the numerical control apparatus 200. The block acquisition section 12 acquires, for example, information identifying an active program and information indicating the position of the tool 101 in the workpiece coordinate system from the numerical control apparatus 200.

The path determination section 13 is, for example, implemented by operation of the CPU. The path determination section 13 identifies the paths and movement directions of the tool 101 in the workpiece coordinate system in accordance with a plurality of successive time-series program blocks. Specifically, the path determination section 13 determines movement paths and movement directions by using an active program block or program block to be executed next and one or more program blocks to be executed in the future from a series of program blocks. The path determination section 13 determines the active program block and the position of the tool 101 from the acquired information indicating the position of the tool 101 in the workpiece coordinate system and the information identifying the active program block.

Figure 3:
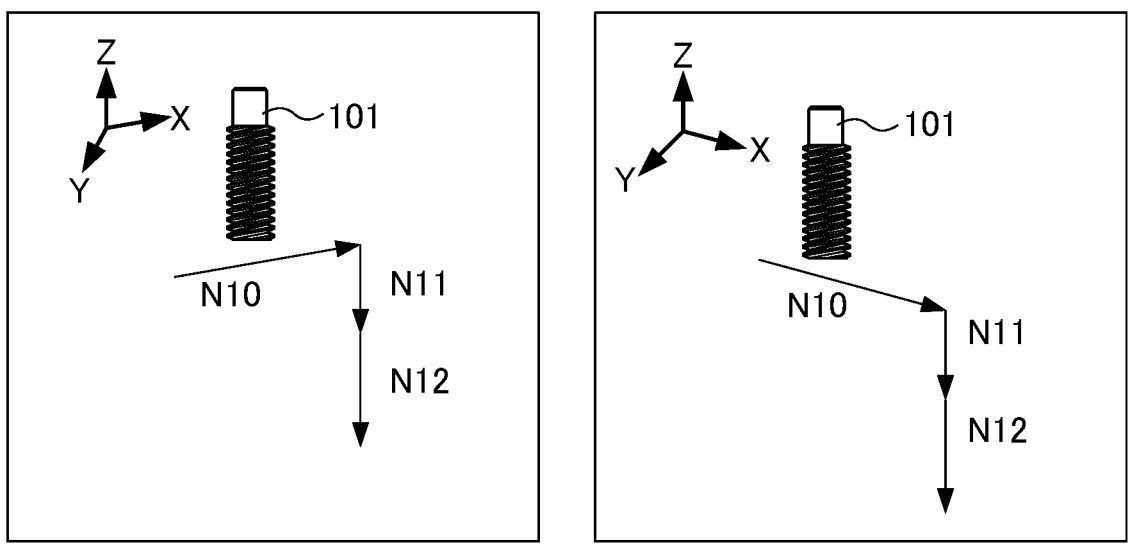
FIG. 3 is a conceptual view showing a path and a movement direction of a tip of a tool, displayed by a pair of display sections, in the augmented reality glasses device and the display program according to the first embodiment.

The display control section 14 is, for example, implemented by operation of the CPU. The display control section 14 causes the display sections 11 to stereographically display the determined paths and movement directions of the tool 101. As shown in FIG. 3, the display control section 14 causes, for example, each of the pair of right and left display sections 11 to display a parallax image representing the paths and movement directions of the tip of the tool 101 in the workpiece coordinate system. In other words, the display control section 14 causes the display sections 11 to display the paths and movement directions of the tip of the tool 101 for a current operation and a future operation as stereo images. Thus, the display control section 14 provides the worker H with a three-dimensional image (3D image). The display control section 14 displays marks (in FIG. 3, N10, N11, and N12) for identifying program blocks together with the paths and the movement directions. In the present embodiment, as shown in FIG. 3, the display control section 14 causes the display sections 11 to display the paths and movement directions of the tool 101 together with the coordinate axes of the workpiece coordinate system. The display control section 14 causes the display sections 11 to display the determined active program blocks and the determined position of the tool 101.

The acquisition number limiting section 15 is, for example, implemented by operation of the CPU. The acquisition number limiting section 15 limits the number of program blocks to be acquired by the block acquisition section 12 in accordance with the designated number of program blocks to be acquired or a movement distance of the tool 101 to move as a result of running of the program blocks. The acquisition number limiting section 15, for example, limits the number of program blocks to be acquired by the block acquisition section 12 to three. Thus, the acquisition number limiting section 15 limits the paths and movement directions of the tip of the tool 101, determined by the path determination section 13, to paths and movement directions over a series of three program blocks. The acquisition number limiting section 15, for example, limits the number of program blocks to be acquired by the block acquisition section 12 by limiting the movement distance of the tool 101. Thus, the acquisition number limiting section 15 limits the number of a series of program blocks to be used in determination of the path determination section 13 such that the movement distance of the tool 101 to move in accordance with a series of program blocks falls within a predetermined range. Specifically, the acquisition number limiting section 15 sums the movement distances of the tool 101 in a series of program blocks in accordance with an active program block or a program block to run next. The acquisition number limiting section 15 limits the number of program blocks to be acquired to the number of program blocks by which the movement distance of the tool 101 is the longest distance and does not exceed a predetermined distance.

The imaging section 16 is, for example, an apparatus that captures images. The imaging section 16 is configured to be capable of acquiring images that respectively pass through the display sections 11 and that each contain the tool 101 as captured images. In other words, the imaging section 16 is configured to be capable of acquiring the images of the tool 101 of the machine tool 100 via the display sections 11 as captured images. The images of the tool 101 of the machine tool 100 are visually identified by the worker H. The imaging section 16, for example, acquires a captured image for each of the pair of right and left display sections 11. The imaging section 16 captures images that each contain the table 102. The imaging section 16, for example, captures images that each contain the tip of the tool 101 and the table 102.

The position identification section 17 is, for example, implemented by operation of the CPU. The position identification section 17 identifies the position of the tip of the tool 101 contained in each of the captured images. The position identification section 17, for example, identifies the relative position of the tip of the tool 101 in the workpiece coordinate system by recognizing a marker for position detection, attached to the tip of the tool 101, in each of the captured images. The position identification section 17 identifies the position of the table 102 contained in each of the captured images.

The manual operation identification section 18 is, for example, implemented by operation of the CPU. The manual operation identification section 18 identifies a switch from automatic operation of the machine tool 100 to manual operation of the machine tool 100. The manual operation identification section 18 identifies, for example, a switch from a mode (automatic control) in which the machine tool 100 is controlled by the numerical control apparatus 200 to a mode (manual control) in which the machine tool 100 is operated by using the pulse generator.

The movement direction acquisition section 19 is, for example, implemented by operation of the CPU. When a switch to the manual operation is identified, the movement direction acquisition section 19 acquires a manually designated movement direction of at least one of the tool 101 and the table 102. The movement direction acquisition section 19 acquires, for example, the movement direction of at least one of the tool 101 and the table 102 to operate in accordance with a movement command on the axis determined by the pulse generator from the numerical control apparatus 200.

Figure 4:
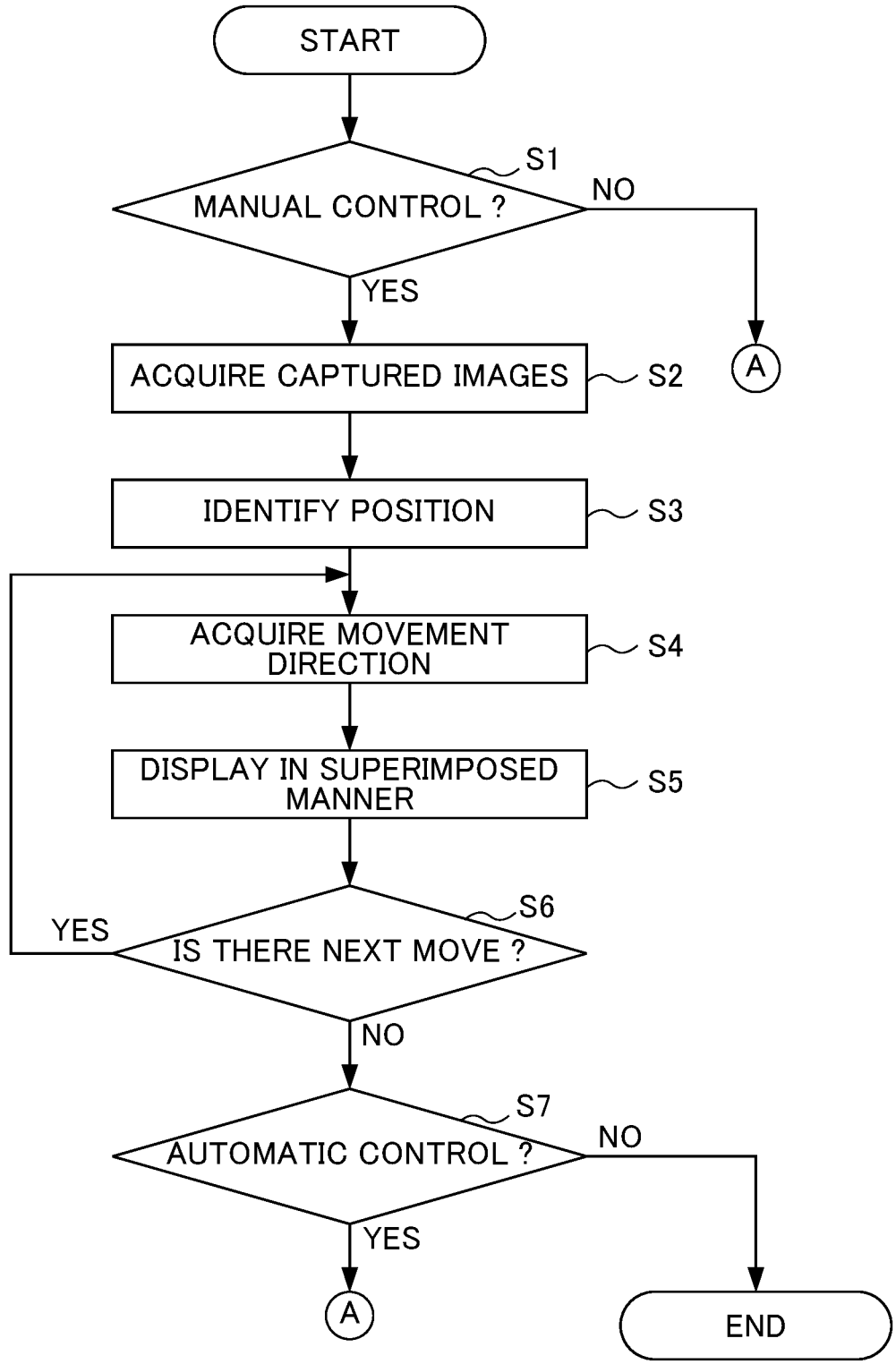
FIG. 4 is a flowchart showing the flow of a process in the augmented reality glasses device and the display program according to the first embodiment.

Next, an operation using the augmented reality glasses device 1 will be described with reference to the flowchart of FIG. 4. In this flow, an example in which the machine tool 100 is manually controlled and then automatically controlled will be described.

[Manual Control]

First, the manual operation identification section 18 identifies whether control for the operation of the machine tool 100 is manual control. The manual operation identification section 18 identifies, for example, whether control is manual control by acquiring the operation mode from the numerical control apparatus 200. When control is manual control (YES in step S1), the process proceeds to step S2. When control is automatic control (NO in step S2), the process proceeds to step S11 in FIG. 5.

In step S2, the imaging section 16 acquires captured images. The imaging section 16 acquires, for example, images that respectively pass through the pair of display sections 11 as captured images.

Subsequently, the position identification section 17 identifies the tip position of the tool 101 and the position of the table 102, contained in each of the captured images (step S3). The position identification section 17 identifies, for example, the tip position of the tool 101 and the position of the table 102 by using the markers attached to the tip of the tool 101 and the table 102.

Subsequently, the movement direction acquisition section 19 acquires the movement direction along each axis, set by using the pulse generator (step S4). The movement direction acquisition section 19 acquires, for example, via the numerical control apparatus 200, information about the axes (operation axes) designated by the pulse generator. The movement direction acquisition section 19 acquires an operation direction in which the tool 101 or the table 102 or both are actually driven by the pulse generator. The movement direction acquisition section 19 acquires, for example, information on the movement direction (a plus direction or a minus direction) of an operation axis by acquiring the rotation direction of a dial pulse generator.

Figure 6:
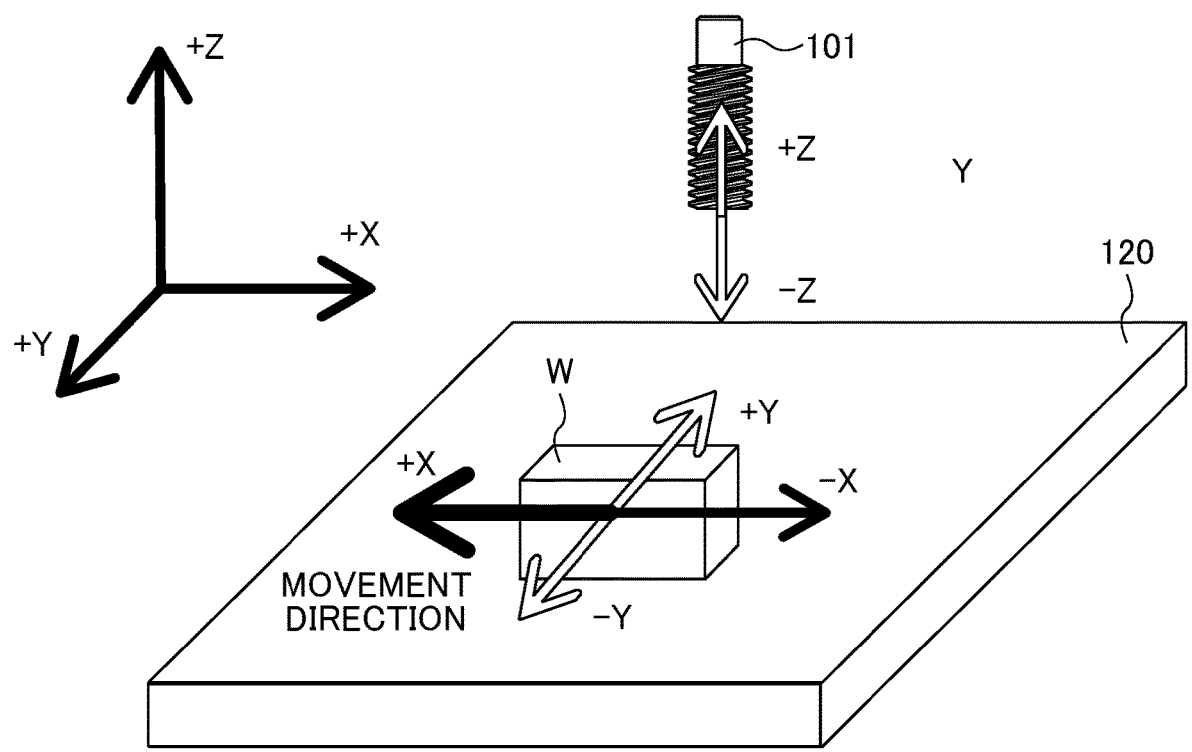
FIG. 6 is a conceptual view showing paths and movement directions in a superimposed manner on the tip of the tool and a table, displayed by the pair of display sections, in the augmented reality glasses device and the display program according to the first embodiment.
Figure 7:
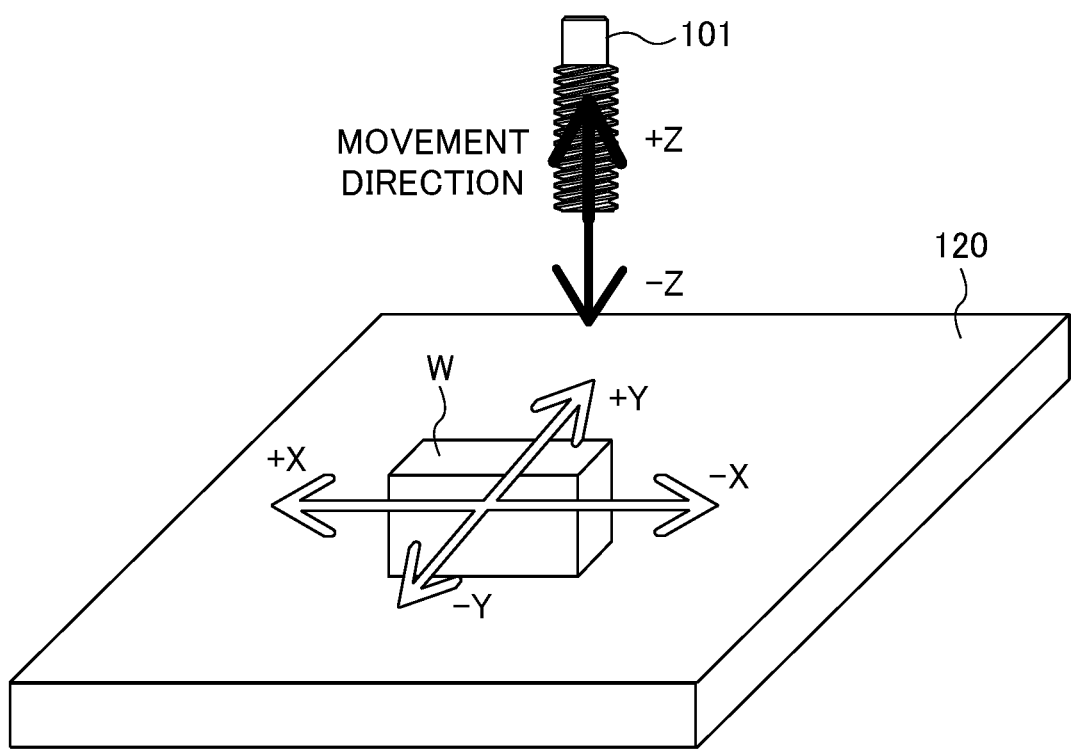
FIG. 7 is a conceptual view showing paths and movement directions in a superimposed manner on the tip of the tool and the table, displayed by the pair of display sections, in the augmented reality glasses device and the display program according to the first embodiment.

Subsequently, the display control section 14 causes the display sections 11 to display the acquired operation axis and movement direction (step S5). The display control section 14 causes the display sections 11 to display the operation axis and the movement direction in a superimposed manner on the tool 101 at the tip position or on the table 102. As shown in FIG. 6, the display control section 14 causes, for example, the display sections 11 to display that the table 102 operates along the operation axis set to the X-axis in the movement direction set to the plus direction in a superimposed manner at the position of the table 102 contained in each of the captured images. For example, as shown in FIG. 7, the display control section 14 causes the display sections 11 to display that the tip of the tool 101 operates along the operation axis set to the Z-axis in the movement direction set to the plus direction in a superimposed manner at the position of the tip of the tool 101 contained in each of the captured images. The display control section 14 may cause, for example, the display sections 11 to display superimposed images as stereo images.

Subsequently, it is determined whether there is a subsequent move driven by the pulse generator (step S6). When there is a subsequent move driven by the pulse generator (YES in step S6), the process returns to step S4. On the other hand, when there are no more moves driven by the pulse generator (NO in step S6), the process proceeds to step S7.

In step S7, the manual operation identification section 18 determines whether to switch the operation mode from manual operation to automatic operation. When the operation mode is switched (YES in step S7), the process proceeds to step S11 of FIG. 5. On the other hand, when the operation mode is not switched (NO in step S7), the flow ends.

[Automatic Control]

Figure 5:
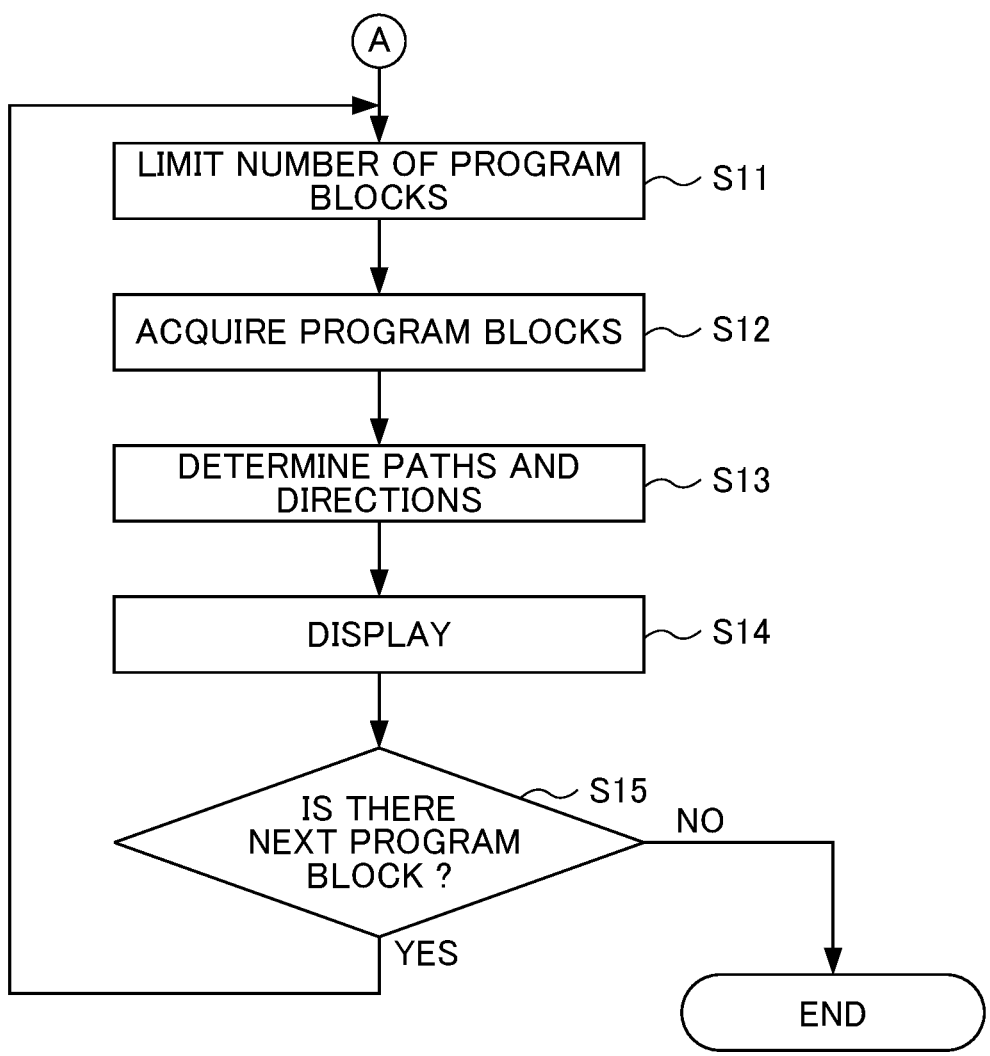
FIG. 5 is a flowchart showing the flow of a process in the augmented reality glasses device and the display program according to the first embodiment.

As shown in FIG. 5, the acquisition number limiting section 15 limits the number of program blocks to be acquired from the numerical control apparatus 200 (step S11). Subsequently, the block acquisition section 12 acquires the limited number of program blocks from the numerical control apparatus 200 (step S12).

The path determination section 13 determines the relative paths and movement directions of the tip of the tool 101 in the workpiece coordinate system from the acquired program blocks (step S13). The path determination section 13 determines the active program block and the position of the tool 101. As shown in FIG. 3, the display control section 14 causes the display sections 11 to display the determined paths and movement directions as stereo images (step S14). The display control section 14 causes the display sections 11 to display the determined active program block and the determined position of the tool 101.

Subsequently, it is determined whether there is a subsequent program block (step S15). When there is a subsequent program block (YES in step S15), the process returns to step S11; whereas, when there is no subsequent program block (NO in step S15), the process in this flow ends.

Next, the display program according to the present embodiment will be described. The components included in the augmented reality glasses device 1 are implemented by hardware or software or by a combination of hardware and software. Here, the components implemented by software are components implemented by a computer loading the display program.

The display program may be stored on various types of non-transitory computer readable media and supplied to a computer. The non-transitory computer readable medium includes various types of tangible storage media. Examples of the non-transitory computer readable medium include a magnetic storage medium (for example, a floppy disk, a magnetic tape, or a hard disk drive), a magneto-optical storage medium (for example, a magneto-optical disk), a CD-ROM (Compact Disc Read-Only Memory), a CD-R, a CD-R/W, and semiconductor memory (for example, mask ROM, PROM (programmable ROM), EPROM (erasable PROM), flash ROM, or RAM (random access memory)). The display program may be supplied to a computer from various types of transitory computer readable media. Examples of the transitory computer readable medium include electric signals, optical signals, and electromagnetic waves. The transitory computer readable medium enables the display program to be supplied to a computer via a wired communication path, such as an electric wire and an optical fiber, or a wireless communication path.

With the augmented reality glasses device 1 and the display program according to the first embodiment, the following advantageous effects are obtained.

(1) The augmented reality glasses device 1 including the pair of transmissive display sections 11 and capable of displaying the path of the tool 101 of the machine tool 100 with the tool 101 on the display sections 11 includes the block acquisition section 12 that acquires program blocks causing the tool 101 to move and operate, the path determination section 13 that determines the path and the movement direction of the tool 101 in the workpiece coordinate system in accordance with a plurality of the acquired successive time-series program blocks, and the display control section 14 that causes the display sections 11 to stereographically display the determined path and the movement direction of the tool 101. Thus, the worker H by which the augmented reality glasses device 1 is worn is able to grasp the path and the movement direction of the tool 101 as a three-dimensional image (3D image). Therefore, it is possible to enable the worker H to intuitively grasp the relative path and the movement direction of the tip of the tool 101.

(2) The display control section 14 causes the display sections 11 to display the path and the movement direction of the tool 101 together with coordinate axes. Thus, the movement direction of the tip of the tool 101 when the workpiece coordinate system is viewed from the position of the worker H is shown in comparison with the coordinate axes. Therefore, it is possible to enable the worker H to further intuitively grasp the relative path and the movement direction of the tip of the tool 101.

(3) The augmented reality glasses device 1 further includes the acquisition number limiting section 15 limiting the number of program blocks to be acquired by the block acquisition section 12 in accordance with the designated number of program blocks to be acquired or a movement distance of the tool 101 to move as a result of running of the program blocks to be acquired. Thus, the amount of information of program blocks held by the augmented reality glasses device 1 is limited. Therefore, memory capacity that is used in the augmented reality glasses device 1 is saved.

(4) The augmented reality glasses device 1 further includes the imaging section 16 capable of capturing images that respectively pass through the display sections 11 and that each contain the tool 101 as captured images, and the position identification section 17 identifying the position of the tip of the tool 101 contained in each of the captured images. The display control section 14 causes the display sections 11 to display the path and the movement direction of the tool 101 in a superimposed manner at the position of the tip of the tool 101 contained in each of the captured images. It is possible to display the path and the movement direction of the tool 101 in a superimposed manner at the position of the tip of the actual tool 101, so it is possible to provide the device that is easy to further intuitively obtain the path and the movement direction of the tip of the tool 101. When the tip position of the tool 101 of the machine tool 100 is not visually identified from the outside, the path and the movement direction of the tool 101 are shown in the workpiece coordinate system. On the other hand, when the tip position of the tool 101 of the machine tool 100 is visually identified from the outside, the path and the movement direction of the tool 101 are shown as the path of the actual tool 101. Thus, the augmented reality glasses device 1 is a device that is capable of showing the path and the movement direction of the tool 101 even when the tip position of the tool 101 is not visually identified. The augmented reality glasses device 1 is a device that is capable of further intuitively displaying a path and a movement direction in a superimposed manner at the position of the tip of the tool 101 when the tip position of the tool 101 is visually identified.

(5) The imaging section 16 captures images that each contain the table 102. The position identification section 17 identifies the position of the table 102. The path determination section 13 identifies the path and the movement direction of the table 102 in the workpiece coordinate system in accordance with a plurality of successive time-series program blocks and the position of the table 102. The display control section 14 causes the display sections 11 to display the path and the movement direction of the table 102 in a superimposed manner at the position of the table 102 contained in each of the captured images. Thus, it is possible to separately display the path and the movement direction of the tip of the tool 101 and the table 102, so it is possible to enable the worker H to intuitively grasp the operation of the actual machine.

(6) The augmented reality glasses device 1 further includes the manual operation identification section 18 that identifies a switch from the automatic operation of the machine tool 100 to the manual operation of the machine tool 100, and the movement direction acquisition section 19, when a switch to the manual operation is identified, that acquires a manually designated movement direction of at least one of the tool 101 and the table 102. The display control section 14 displays the acquired movement direction in a superimposed manner on at least one of the tool 101 and the table 102. Thus, it is possible to change the display mode between a manual control mode in which the tip of the actual tool 101 is visually identified and an automatic control mode that runs during a machining operation, so as to provide a further user-friendly device.

(7) The display program causes a computer to function as the augmented reality glasses device 1 that includes the pair of transmissive display sections 11 and that is capable of displaying the path of the tool 101 in the machine tool 100 on the display sections 11. The display program causes the computer to function as the block acquisition section 12 that acquires program blocks causing the tool 101 to move and operate, the path determination section 13 that determines the path and the movement direction of the tool 101 in the workpiece coordinate system in accordance with a plurality of the successive time-series program blocks, and the display control section 14 that causes the display sections 11 to stereographically display the determined path and the movement direction of the tool 101. Thus, the worker H by which the augmented reality glasses device 1 is worn is able to grasp the path and the movement direction of the tool 101 as a three-dimensional image (3D image). Therefore, it is possible to enable the worker H to intuitively grasp the relative path and the movement direction of the tip of the tool 101.

Second Embodiment

Figure 8:
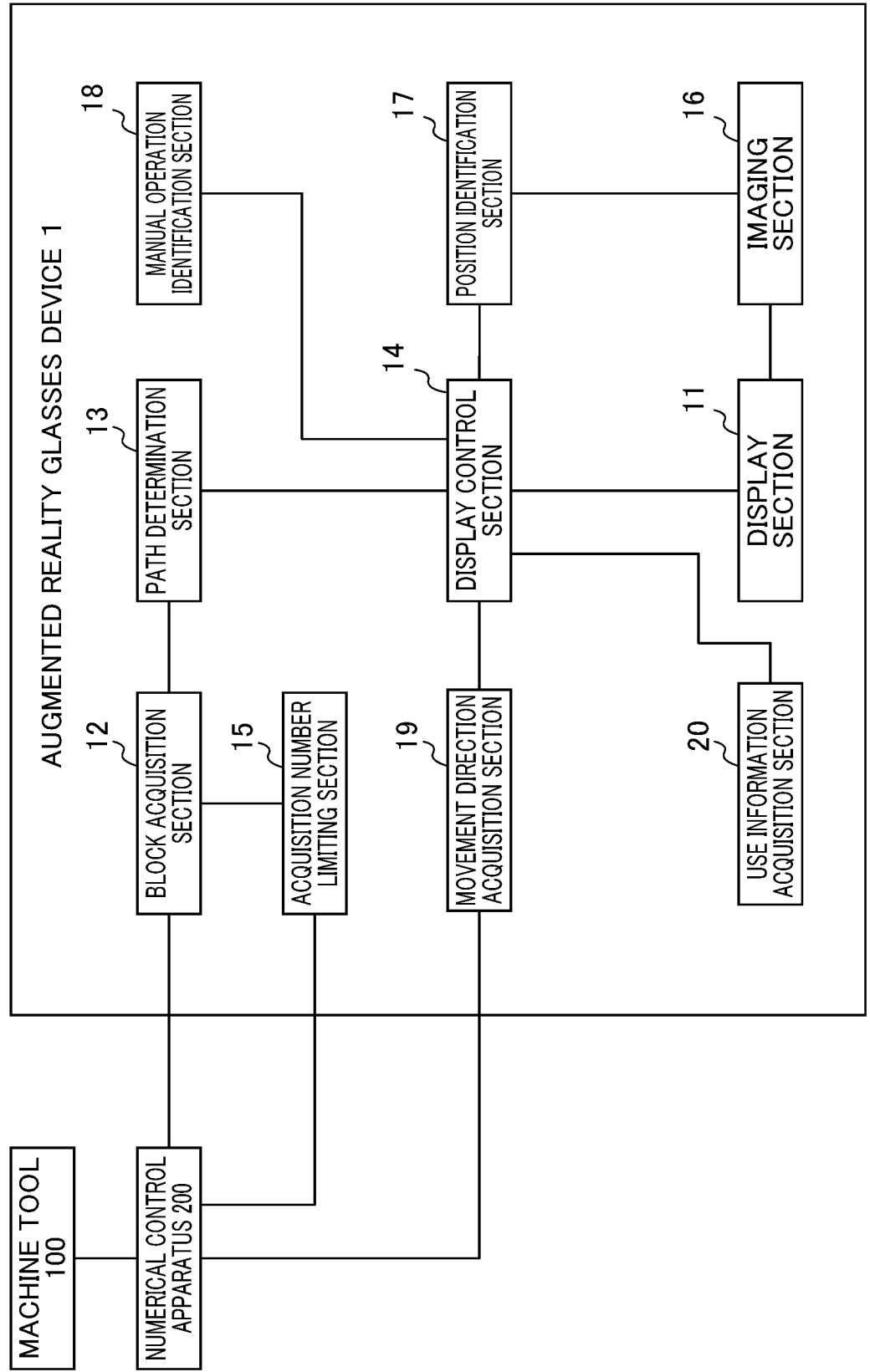
FIG. 8 is a block diagram showing the configuration of an augmented reality glasses device according to a second embodiment.
Figure 9:
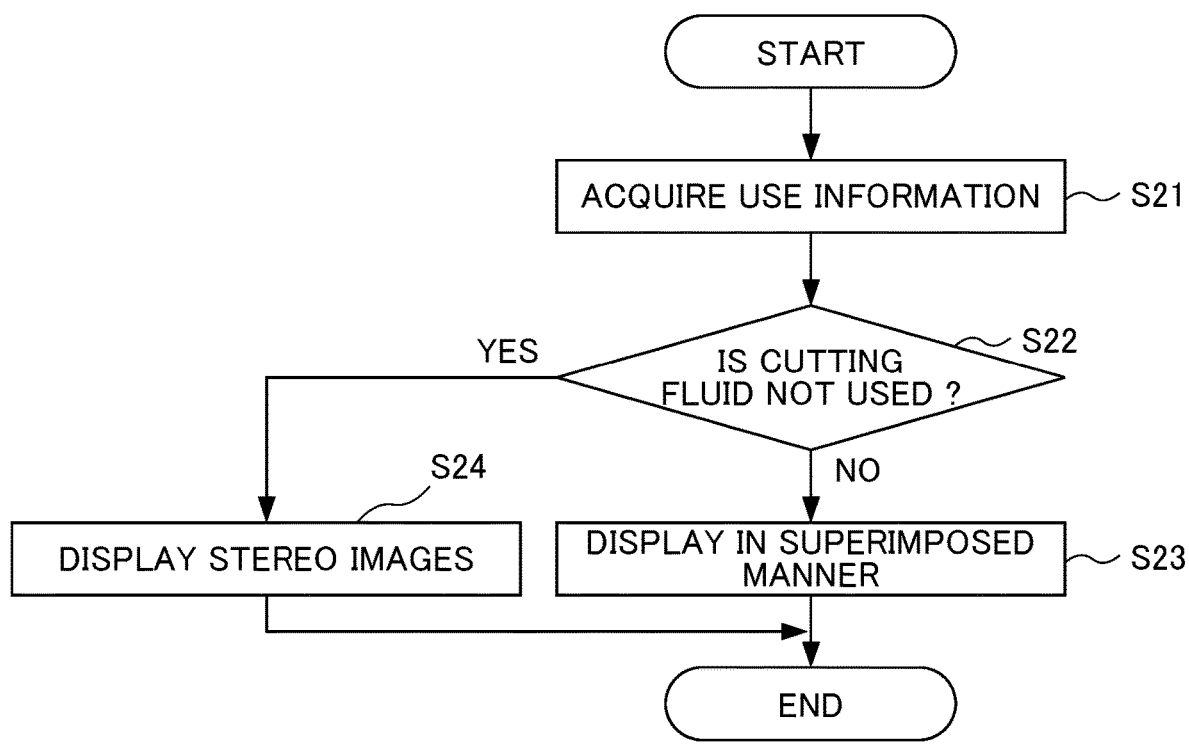
FIG. 9 is a flowchart showing the flow of a process in the augmented reality glasses device and a display program according to the second embodiment.
Figure 10:
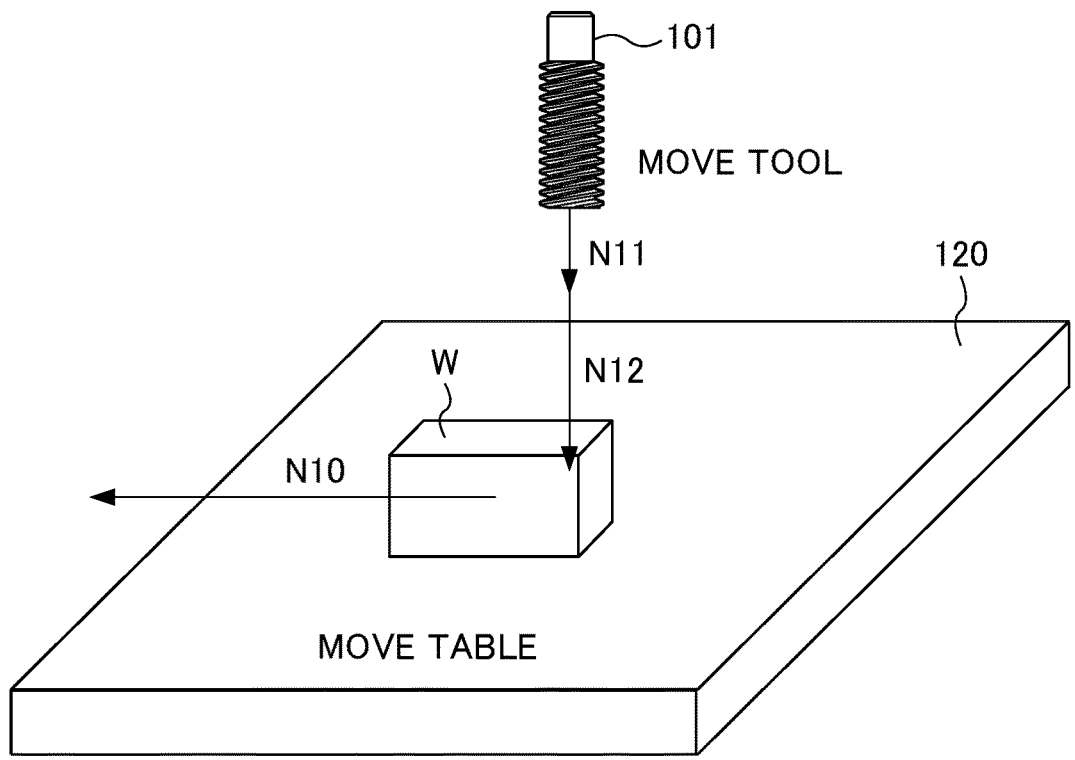
FIG. 10 is a conceptual view showing paths and movement directions in a superimposed manner on the tip of the tool and the table, displayed by a pair of display sections, in the augmented reality glasses device and the display program according to the second embodiment.

Next, the augmented reality glasses device 1 and the display program according to a second embodiment will be described with reference to FIG. 8 to FIG. 10. As shown in FIG. 8, the augmented reality glasses device 1 and the display program according to the second embodiment differ from those of the first embodiment in that a use information acquisition section 20 that acquires whether cutting fluid is used in the machine tool 100 as use information is further provided. In addition, the augmented reality glasses device 1 and the display program according to the second embodiment differ from those of the first embodiment in that, when the use information indicates that no cutting fluid is used, the display control section 14 causes the display sections 11 to display the path and the movement direction of the tool 101 in a superimposed manner at the position of the tip of the tool 101 contained in each of the captured images.

The use information acquisition section 20 is implemented, for example, by operation of the CPU. The use information acquisition section 20 acquires whether cutting fluid is used in the machine tool 100 as the use information. In other words, the use information acquisition section 20 acquires whether the tip of the tool 101 is hidden as a result of the use of cutting fluid as the use information.

Next, the operation of the augmented reality glasses device 1 according to the present embodiment will be described with reference to FIG. 9. This flow is configured as a sub-routine of step S14 of FIG. 5. As shown in FIG. 9, the use information acquisition section 20 acquires the use information from the numerical control apparatus 200 (step S21). Subsequently, it is determined whether cutting fluid is used (step S22). When cutting fluid is not used (NO in step S22), the process proceeds to step S23. On the other hand, when cutting fluid is used (YES in step S22), the display control section 14 causes, for example, the pair of right and left display sections 11 to display stereo images showing the path and the movement direction of the tip of the tool 101 in the workpiece coordinate system, as shown in FIG. 3 (step S24). Thus, the flow ends.

In step S23, the display control section 14 causes the display sections 11 to display the path and the movement direction of the tip of the tool 101 in a superimposed manner at the position of the tip of the actual tool 101 contained in each of the captured images. As shown in FIG. 10, the display control section 14 causes, for example, the display sections 11 to separately display the move of the tool 101 and the move of the table 102. Thus, the flow ends.

With the augmented reality glasses device 1 and the display program according to the second embodiment, the following advantageous effects are obtained.

(8) The augmented reality glasses device 1 further includes the use information acquisition section 20 that acquires whether cutting fluid is used in the machine tool 100 as use information. When the use information indicates that cutting fluid is not used, the display control section 14 causes the display sections 11 to display the path and the movement direction of the tool 101 in a superimposed manner at the position of the tip of the tool 101 contained in each of the captured images. Thus, when cutting fluid is not required during debugging, or the like, it is possible to show the path and the movement direction relative to the position of the tip of the tool 101 in the workpiece coordinate system at the position of the tip of the actual tool 101. Therefore, it is possible to further intuitively show the path and the movement direction of the tool 101 to the worker H.

The embodiments of the augmented reality glasses device and display program according to the disclosure are described; however, the disclosure is not limited to the above-described embodiments and may be modified as needed.

Figure 11:
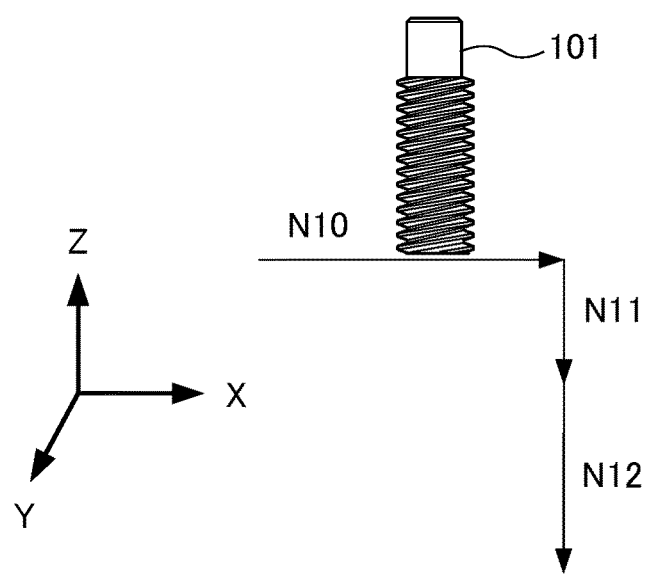
FIG. 11 is a conceptual view showing paths and movement directions of a tip of a tool, displayed by a pair of display sections, in an augmented reality glasses device according to a modification.
Figure 12:
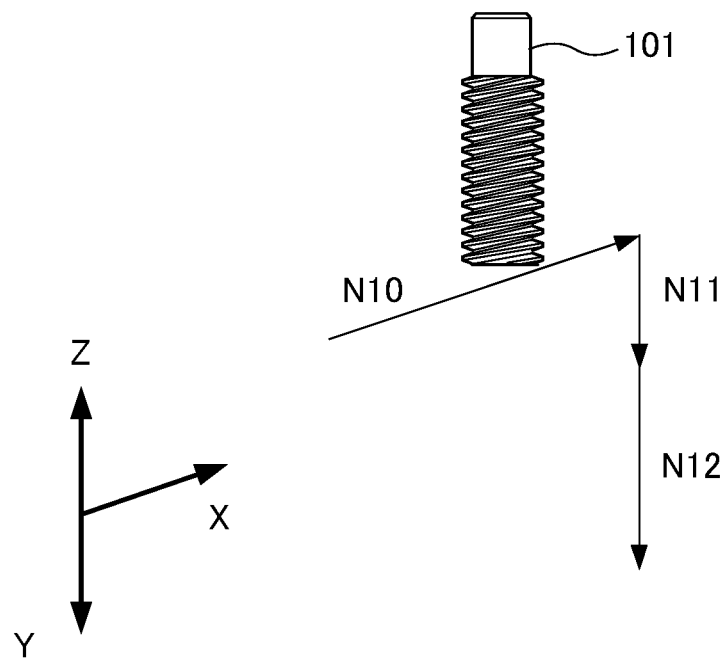
FIG. 12 is a conceptual view showing paths and movement directions of a tip of a tool, displayed by a pair of display sections, in an augmented reality glasses device according to a modification.

For example, in the above-described embodiments, when the angle of each display section 11 relative to the tip position of the tool 101 is changed, the angle of the path may be changed according to the change of the angle. For example, the augmented reality glasses device 1 may further include a displacement acquisition section (not shown) that acquires a displacement in angle relative to the actual position of the tool 101. The display control section 14 changes the angle of the workpiece coordinate system displayed on each display section 11 according to a displacement in angle, acquired by the displacement acquisition section. For example, the display control section 14 may change the angle of the path and the movement direction of the tip of the tool 101 to be displayed on each display section 11 as shown in FIG. 12 from an image of which the X, Y, and Z-axes are fixed as shown in FIG. 11 and display the changed image. The display control section 14 may receive input of a position that is the reference of a displacement in angle through an input section (not shown) and change the view according to a displacement from the reference position. The display control section 14 may receive, for example, input of a path and a movement direction to be drawn from a predetermined angle as a reference position and draw a path and a movement direction of which the angle is changed according to a displacement from the reference position.

In the above-described second embodiment, the use information acquisition section 20 acquires use information to determine whether cutting fluid is used; however, the configuration is not limited thereto. Whether cutting fluid is used may be determined in accordance with, for example, whether the position identification section 17 is able to identify an image (marker) at the position of the tip of the tool 101 contained in each of images captured by the imaging section 16. When the position identification section 17 is able to identify an image (marker) at the position of the tip of the tool 101, the display control section 14 may superimpose the movement direction of the tip of the tool 101 at the position of the tip of the actual tool 101. The display control section 14 may superimpose the movement direction of the table 102 at the position of the actual table 102.

In the above-described embodiments, the display control section 14 may further cause the display sections 11 to display the coordinates of each axis. The display control section 14 may further display a movement distance (remaining movement distance) of the tool 101 resulting from running of program blocks following the active program block. In this case, the acquisition number limiting section 15 may calculate the movement distance of the tool 101 to move as a result of running of the remaining program block(s) out of program blocks set in the numerical control apparatus 200.

In the above-described embodiments, the acquisition number limiting section 15 is configured to limit the number of program blocks to be acquired in accordance with the designated number of program blocks or a movement distance of the tool 101 to move as a result of running of program blocks; however, the configuration is not limited thereto. The acquisition number limiting section 15 may limit, for example, the number of program blocks to be acquired in accordance with the capacity of a memory included in the augmented reality glasses device 1 or the designated number of program blocks manually input in advance.

In the above-described embodiments, the block acquisition section 12 is configured to acquire information on the position of the tool 101 in the workpiece coordinate system; however, the configuration is not limited thereto. The block acquisition section 12 may acquire, for example, information on the position of the tool 101 only for a program block(s) having a block length longer than a predetermined length. In this case, the path determination section 13 may determine only the active program block instead of the position of the tool 101.

In the above-described embodiments, the path determination section 13 is configured to determine the active program block and the position of the tool from the acquired information indicating the position of the tool in the workpiece coordinate system and information identifying the active program block; however, the configuration is not limited thereto. For example, the path determination section 13 may determine the position of the tool by determining whether there is a delay in communication from the numerical control apparatus 200 to the block acquisition section 12. In this case, the path determination section 13 may determine the position of the tool 101 in accordance with information indicating the position of the tool 101 and the amount of deviation of the tool 101, calculated in consideration of a delay.

In the above-described embodiments, when there are constraints on communication speed between the numerical control apparatus 200 and the augmented reality glasses device 1, the block acquisition section 12 does not need to acquire information indicating the position of the tool 101. In this case, the path determination section 13 does not need to determine the position of the tool 101. The display control section 14 may cause the display sections 11 to display a path in which the tool 101 is present as the position of the tool 101 by causing the display sections 11 to display the active program block with highlight.

EXPLANATION OF REFERENCE NUMERALS 1 augmented reality glasses device
11 display section
12 block acquisition section
13 path determination section
14 display control section
15 acquisition number limiting section
16 imaging section
17 position identification section
18 manual operation identification section
19 movement direction acquisition section
20 use information acquisition section
100 machine tool
101 tool
102 table
200 numerical control apparatus
W workpiece

What is claimed is:

1. An augmented reality glasses device including a processor and a pair of transmissive displays, the augmented reality glasses device being capable of displaying a path of a tool in a machine tool on the displays during a machining operation, the augmented reality glasses device comprising:
a block acquisition section of the processor that acquires a plurality of successive time-series program blocks from a numerical control apparatus for causing the machine tool to move and operate the tool, the plurality of successive time-series program blocks being program blocks of a machining program set in advance of the machining operation in the numerical control apparatus;

a path determination section of the processor that determines a path and a movement direction of the tool in a workpiece coordinate system, the path and movement direction being controlled by the numerical control apparatus in accordance with the plurality of acquired successive time-series program blocks;

a display control section of the processor that causes the displays to stereographically display the determined path and movement direction of the tool;

an imaging section of the processor that captures images that respectively pass through the displays and that each contain the tool as captured images;

a position identification section of the processor that identifies a position of a tip of the tool contained in each of the captured images; and a use information acquisition section of the processor that acquires whether cutting fluid is used in the machine tool as use information; wherein when the use information indicates that no cutting fluid is used, the display control section causes the displays to display the path and the movement direction of the tool in a superimposed manner at the position of the tip of the tool contained in each of the captured images; and when the use information indicates that cutting fluid is used, the display control section causes the displays to display the path and the movement direction of the tool in the workpiece coordinate system.

2. The augmented reality glasses device according to claim 1, wherein the display control section causes the displays to display the path and the movement direction of the tool together with coordinate axes.

3. The augmented reality glasses device according to claim 1, further comprising an acquisition number limiting section of the processor that limits a number of the program blocks to be acquired by the block acquisition section in accordance with a designated number of the program blocks to be acquired or a movement distance of the tool to move as a result of running of the program blocks to be acquired.

4. The augmented reality glasses device according to claim 1, wherein the image capturing apparatus captures images that each contain a table of the machine tool for mounting a workpiece as captured images, the position identification section identifies a position of the table, the path determination section identifies a path and a movement direction of the table in the workpiece coordinate system in accordance with a plurality of the successive time-series program blocks and the position of the table, and the display control section causes the display sections to display the path and the movement direction of the table in a superimposed manner at the position of the table contained in each of the captured images.

5. The augmented reality glasses device according to claim 4, further comprising:

a manual operation identification section of the processor that identifies a switch from an automatic operation of the machine tool to a manual operation of the machine tool; and a movement direction acquisition section of the processor that, when a switch to the manual operation is identified, acquires a manually designated movement direction of at least one of the tool and the table, wherein the display control section displays the acquired movement direction in a superimposed manner on at least one of the tool and the table.

6. A non-transitory storage medium on which a display program is stored, the display program causing a computer to function as an augmented reality glasses device, the augmented reality glasses device including a pair of transmissive displays, the augmented reality glasses device being capable of displaying a path of a tool in a machine tool on the displays during a machining operation, the display program causing the computer to function as:

a block acquisition section that acquires a plurality of successive time-series program blocks from a numerical control apparatus for causing the machine tool to move and operate the tool, the plurality of successive time-series program blocks being program blocks of a machining program set in advance of the machining operation in the numerical control apparatus;

a path determination section that determines a path and a movement direction of the tool in a workpiece coordinate system, the path and movement direction being controlled by the numerical control apparatus in accordance with the plurality of successive time-series program blocks;

a display control section that causes the displays to stereographically display the determined path and movement direction of the tool;

an image capturing section that captures images that respectively pass through the displays and that each contain the tool as captured images;

a position identification section of the processor that identifies a position of a tip of the tool contained in each of the captured images; and a use information acquisition section that acquires whether cutting fluid is used in the machine tool as use information; wherein when the use information indicates that no cutting fluid is used, the display control section causes the displays to display the path and the movement direction of the tool in a superimposed manner at the position of the tip of the tool contained in each of the captured images; and when the use information indicates that cutting fluid is used, the display control section causes the displays to display the path and the movement direction of the tool in the workpiece coordinate system.

* * * * *